United States Patent
Otanez et al.

(10) Patent No.: US 8,948,986 B2
(45) Date of Patent: Feb. 3, 2015

(54) ACCUMULATOR FLUID TEMPERATURE ESTIMATION ALGORITHM

(75) Inventors: Paul G. Otanez, Troy, MI (US); Zhen J. Zhang, Canton, MI (US)

(73) Assignee: GM Global Technology Operations LLC

( * ) Notice: Subject to any disclaimer, the term of this patent is extended or adjusted under 35 U.S.C. 154(b) by 364 days.

(21) Appl. No.: 13/558,820

(22) Filed: Jul. 26, 2012

(65) Prior Publication Data
US 2014/0032065 A1 Jan. 30, 2014

(51) Int. Cl.
G06F 7/00 (2006.01)
B60W 10/06 (2006.01)
B60W 20/00 (2006.01)
B60W 30/18 (2012.01)
B60W 10/08 (2006.01)

(52) U.S. Cl.
CPC .............. *B60W 10/06* (2013.01); *B60W 20/00* (2013.01); *B60W 30/18* (2013.01); *B60W 10/08* (2013.01); *B60W 2710/0666* (2013.01)
USPC ..................... 701/54; 701/58; 701/61; 701/62

(58) Field of Classification Search
CPC ..... B60W 10/06; B60W 20/00; B60W 10/08; B60W 2710/0666; B60W 30/18
USPC ................. 477/34, 98; 702/99; 374/E15.001; 701/30.4, 52, 60, 54, 48; 165/51, 152, 165/177, 104.19; 62/3.7; 428/35.8; 60/286, 60/285; 508/468; 303/3
See application file for complete search history.

(56) References Cited

U.S. PATENT DOCUMENTS

| | | | | |
|---|---|---|---|---|
| 4,701,741 A | * | 10/1987 | Bert | 340/449 |
| 5,848,381 A | * | 12/1998 | Ishii et al. | 702/99 |
| 2008/0051250 A1 | * | 2/2008 | Inoue | 477/34 |
| 2009/0233763 A1 | * | 9/2009 | Morgan, Jr. | 477/98 |
| 2009/0250199 A1 | * | 10/2009 | Zhang et al. | 165/152 |

* cited by examiner

*Primary Examiner* — Behrang Badii

(57) ABSTRACT

A system includes an accumulator control module that selectively releases automatic transmission fluid from an accumulator. The accumulator control module also receives a plurality of measured characteristics of the accumulator. A temperature estimation module estimates a temperature of the automatic transmission fluid within the accumulator based on at least one of the measured characteristics of the accumulator. An engine start-stop module selectively disables automatic start-stop events of an internal combustion engine based on the estimated temperature of the automatic transmission fluid within the accumulator.

19 Claims, 3 Drawing Sheets

ACCUMULATOR FLUID TEMPERATURE ESTIMATION ALGORITHM

FIELD

The present disclosure relates to estimating fluid temperature of a vehicle transmission accumulator.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles, including, but not limited to, hybrid engine vehicles, may include engine start-stop functionality that stops and starts an internal combustion engine to limit the idle time of the internal combustion engine. For example, the internal combustion engine may be stopped and restarted when the vehicle is not in motion in order to improve fuel economy.

SUMMARY

A system includes an accumulator control module that selectively releases automatic transmission fluid from an accumulator. The accumulator control module also receives a plurality of measured characteristics of the accumulator. A temperature estimation module estimates a temperature of the automatic transmission fluid within the accumulator based on at least one of the measured characteristics of the accumulator. An engine start-stop module selectively disables automatic start-stop events of an internal combustion engine based on the estimated temperature of the automatic transmission fluid within the accumulator.

In other features, a method includes selectively releasing automatic transmission fluid from an accumulator, receiving a plurality of measured characteristics of the accumulator, estimating a temperature of the automatic transmission fluid within the accumulator based on at least one of the measured characteristics of the accumulator, and selectively disabling automatic start-stop events of an internal combustion engine based on the estimated temperature of the automatic transmission fluid within the accumulator.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Vehicles, including, but not limited to, hybrid engine vehicles, may include engine start-stop functionality that stops and starts an internal combustion engine to limit the idle time of the internal combustion engine. For example, an internal combustion engine may be stopped and restarted when the vehicle is not in motion in order to improve fuel economy. Engine start-stop functionality may verify characteristics of a vehicle to ensure that an internal combustion engine can be stopped and started without harm to the engine. For example, the engine start-stop functionality may ensure that a temperature of an automatic transmission fluid is within a predetermined temperature range before initiating engine start-stop. Accordingly, the automatic transmission fluid temperature is determined before the engine start-stop functionality is performed.

A vehicle fluid accumulator is arranged to accumulate fluid from a transmission of the vehicle within the accumulator. The pressure in the accumulator may be indicative of the automatic transmission fluid temperature in the accumulator. An accumulator fluid temperature estimation system according to the present disclosure may estimate automatic transmission fluid temperature in the accumulator by measuring the pressure in the accumulator and correlating the measured pressure to a temperature value.

Figure 1:
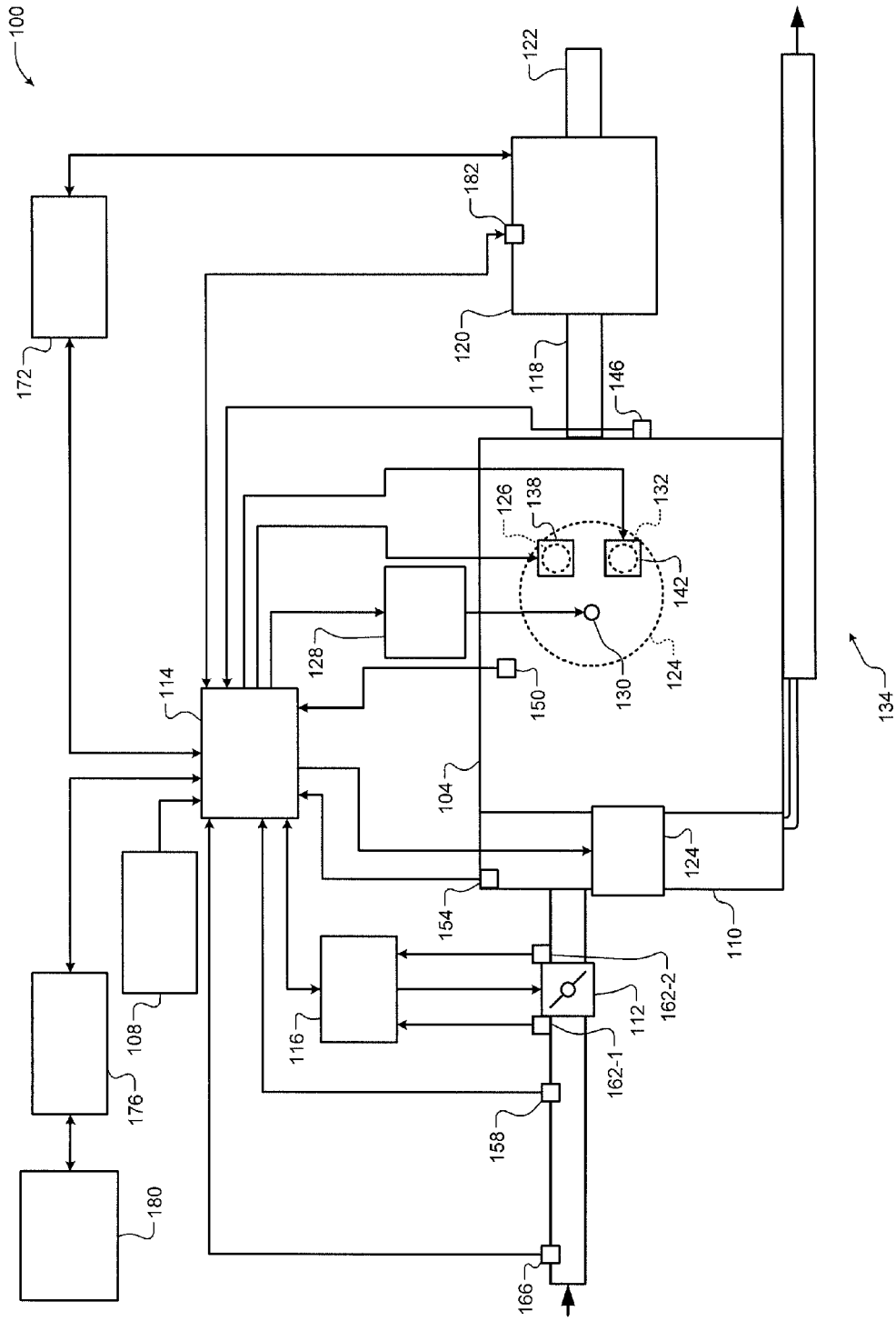
FIG. 1 is a schematic illustration of an engine system according to the present disclosure.

Referring now to FIG. 1, a functional block diagram of an example engine system 100 is presented. The engine system 100 includes an engine 104 that combusts an air/fuel mixture to produce drive torque for a vehicle based on driver input from a driver input module 108.

Air may be drawn into an intake manifold 110 through a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control the amount of air drawn into the intake manifold 110. A torque converter 118 transfers and multiplies torque from the engine 104 and provides the torque to a transmission 120. The transmission 120 operates in one or more gear ratios to transfer the torque to a driveline 122.

Air from the intake manifold 110 is drawn into cylinders of the engine 104. While the engine 104 may include more than one cylinder, for illustration purposes a single representative cylinder 124 is shown. The engine 104 may operate using a four-stroke cycle. The four strokes, described below, may be named the intake stroke, the compression stroke, the combustion stroke, and the exhaust stroke. During each revolution of a crankshaft (not shown), two of the four strokes occur within the cylinder 124. Therefore, two crankshaft revolutions are necessary for the cylinder 124 to experience all four of the strokes.

During the intake stroke, air from the intake manifold 110 is drawn into the cylinder 124 through an intake valve 126. The ECM 114 controls a fuel actuator module 124, which regulates fuel injection to achieve a desired air/fuel ratio. Fuel may be injected into the intake manifold 110 at a central location or at multiple locations, such as near the intake valve 126 of each of the cylinders. In various implementations (not shown), fuel may be injected directly into the cylinders or into mixing chambers associated with the cylinders.

The injected fuel mixes with air and creates an air/fuel mixture in the cylinder 124. During the compression stroke, a piston (not shown) within the cylinder 124 compresses the air/fuel mixture. The engine 104 may be a compression-ignition engine, in which case compression in the cylinder 124 ignites the air/fuel mixture. Alternatively, the engine 104 may be a spark-ignition engine, in which case a spark actuator module 128 energizes a spark plug 130 in the cylinder 124 based on a signal from the ECM 114, which ignites the air/fuel mixture. The timing of the spark may be specified relative to the time when the piston is at its topmost position, referred to as top dead center (TDC).

The spark actuator module 128 may be controlled by a timing signal specifying how far before or after TDC to generate the spark. Because piston position is directly related to crankshaft rotation, operation of the spark actuator module 128 may be synchronized with crankshaft angle.

Generating spark may be referred to as a firing event. The spark actuator module 128 may have the ability to vary the timing of the spark for each firing event. The spark actuator module 128 may even be capable of varying the spark timing for a next firing event when the spark timing is changed between a last firing event and the next firing event.

During the combustion stroke, the combustion of the air/fuel mixture drives the piston away from TDC, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through one or more exhaust valves, such as exhaust valve 132. The byproducts of combustion are exhausted from the vehicle via an exhaust system 134.

An intake valve actuator 138 controls actuation of the intake valve 126. An exhaust valve actuator 142 controls actuation of the exhaust valve 132. The intake and exhaust valve actuators 138 and 142 control opening and closing of the intake and exhaust valves 126 and 132, respectively, without one or more camshafts. The intake and exhaust valve actuators 138 and 142 may include, for example, electo-hydraulic actuators, electro-mechanical actuators, or another suitable type of camless valve actuator. Camless intake and exhaust valve actuators enable actuation of each intake valve and exhaust valve of the engine to be controlled independently. The intake and exhaust valve actuators provide what may be referred to as fully flexible valve actuation (FFVA).

Position of the crankshaft may be measured using a crankshaft position sensor 146. Engine speed, engine acceleration, and/or one or more other parameters may be determined based on the crankshaft position. A temperature of the engine coolant may be measured using an engine coolant temperature (ECT) sensor 150. The ECT sensor 150 may be located within the engine 104 or at other locations where the coolant is circulated, such as a radiator (not shown).

A pressure within the intake manifold 110 may be measured using a manifold absolute pressure (MAP) sensor 154. In various implementations, engine vacuum, which is the difference between ambient air pressure and the pressure within the intake manifold 110, may be measured. A mass flowrate of air flowing into the intake manifold 110 may be measured using a mass air flowrate (MAF) sensor 158. In various implementations, the MAF sensor 158 may be located in a housing that also includes the throttle valve 112.

The throttle actuator module 116 may monitor position of the throttle valve 112 using one or more throttle position sensors (TPS) 162. For example, first and second throttle position sensors 162-1 and 162-2 monitor position of the throttle valve 112 and generate first and second throttle positions (TPS1 and TPS2), respectively, based on the throttle position. A temperature of air being drawn into the engine 104 may be measured using an intake air temperature (IAT) sensor 166. The ECM 114 may use signals from the sensors and/or one or more other sensors to make control decisions for the engine system 100.

A transmission control module 172 may control operation of the transmission 120. The ECM 114 may communicate with the transmission control module 172 for various reasons, such as to share parameters and to coordinate engine operation with operation of the transmission 120. For example, the ECM 114 may selectively reduce engine torque during a gear shift. The ECM 114 may communicate with a hybrid control module 176 to coordinate operation of the engine 104 and an electric motor 180.

The electric motor 180 may also function as a generator and may be used to produce electrical energy for use by vehicle electrical systems and/or for storage in a battery. The electric motor 180 may also function as a motor and may be used, for example, to supplement or replace engine torque output. In various implementations, various functions of the ECM 114, the transmission control module 172, and the hybrid control module 176 may be integrated into one or more modules.

Each system that varies an engine parameter may be referred to as an actuator. Each actuator receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 128 may be referred to as an actuator, while the corresponding actuator value may be the amount of spark advance relative to cylinder TDC. Other actuators may include the fuel actuator module 124. For these actuators, the actuator values may correspond to a number of activated cylinders, fueling rate, intake and exhaust valve timing, boost pressure, and EGR valve opening area, respectively. The ECM 114 may control actuator values in order to cause the engine 104 to generate a desired engine output torque.

The transmission 120 may also include an accumulator module 182 (e.g., including an accumulator). The accumulator selectively accumulates and selectively releases an automatic transmission fluid (ATF). The accumulator module 182 communicates with the ECM 114 and/or the transmission control module 172. For example, the accumulator module 182 may communicate a plurality of characteristics of the accumulator ("accumulator characteristics") including, but not limited to, an accumulator pressure measurement, a position measurement of a piston within the accumulator, and a fluid flow rate measurement of the accumulator. The accumulator module 182 may also receive instructions from the ECM 114 and/or transmission control module 172. For example only, the transmission control module 172 may instruct the accumulator module 182 to release ATF from the accumulator and/or to charge the accumulator with ATF.

The transmission control module 172 may estimate an ATF temperature within the accumulator by communicating with the accumulator module 182. For example, the transmission control module 172 may estimate the ATF temperature within the accumulator based on a change in pressure in the accumulator over a period of time.

The ECM 114 may receive the estimated accumulator ATF temperature from the transmission control module 172. The ECM 114 may enable or disable engine start-stop ("ESS") of the engine 104 based on the accumulator ATF temperature. For example, the ECM 114 may enable ESS of the engine 104 when the accumulator ATF temperature from the transmission control module 172 is within a predetermined temperature range. Conversely, the ECM 114 may disable ESS of the engine 104 when the accumulator ATF is outside of the predetermined temperature range.

Figure 2:
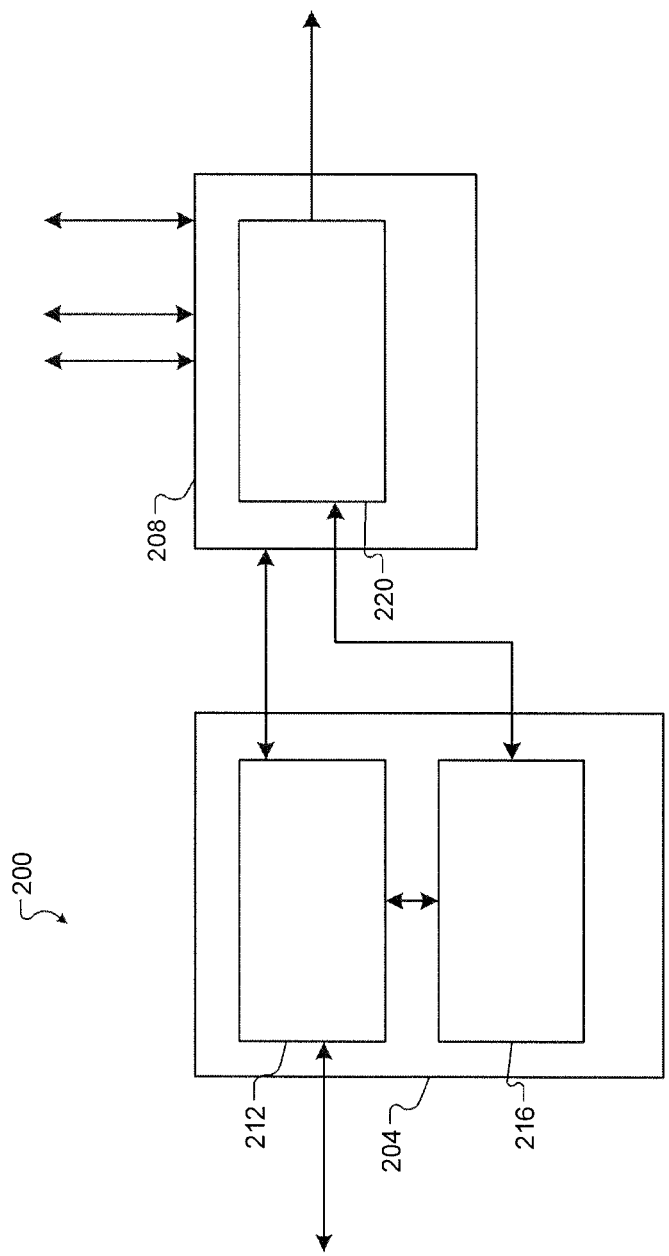
FIG. 2 is a schematic illustration of an accumulator fluid temperature estimation system according to the present disclosure.

Referring now to FIG. 2, an accumulator fluid temperature estimation system 200 includes a transmission control module 204 and an engine control module 208. The transmission control module 204 includes an accumulator control module 212 and an ATF temperature estimation module 216. The engine control module 208 includes an ESS control module 220. The accumulator control module 212 communicates with the accumulator module 182. For example, the accumulator control module 212 may selectively release ATF from the accumulator module 182 in response to a command. The accumulator control module 212 may also receive a plurality of measured characteristics of the accumulator module 182. The accumulator control module 212 communicates with the ATF temperature estimation module 216 and the engine control module 208.

The accumulator control module 212 monitors a plurality of measured characteristics of the accumulator module 182. For example, the accumulator control module 212 may receive a plurality of pressure measurements within the accumulator module 182, a plurality of position measurements of an accumulator piston, and a flow rate measurement associated with the accumulator module 182. The accumulator control module 212 may store respective times of each of the various accumulator measurements.

The ATF temperature estimation module 216 receives the plurality of accumulator characteristics from the accumulator control module 212. The ATF temperature estimation module 216 estimates the accumulator ATF temperature based on the accumulator characteristics. For example, the ATF temperature estimation module 216 may measure a period for the accumulator pressure to decrease from a first predetermined pressure to a second predetermined pressure. The ATF temperature estimation module 216 may determine the accumulator ATF temperature as a function of the period. The function may be embodied as an equation or a look-up table that associates the period with a known temperature.

For example, the ATF temperature estimation module 216 may determine a first time that an accumulator pressure measurement is approximately the first predetermined pressure and a second time that an accumulator pressure measurement is approximately the second predetermined pressure and determine the period of time between the first and second accumulator pressure measurements from the accumulator control module 212. The ATF temperature estimation module 216 correlates the period of time between the first accumulator pressure measurement and the second accumulator pressure measurement to a look-up table corresponding to a known temperature. The ATF temperature estimation module 216 estimates ATF temperature within the accumulator to be the expected temperature correlating to the actual period of time between the first accumulator pressure measure and the second accumulator pressure measurement.

In another example, the ATF temperature estimation module 216 may measure a period for a piston within the accumulator to move from a first predetermined position to a second predetermined position. The ATF temperature estimation module 216 may determine a first time that the piston is approximately at the first predetermined position (a first position measurement) and a second time that the piston is approximately at the second predetermined position (a second position measurement) and determine the period of time between the first and second times. The ATF temperature estimation module 216 correlates the period of time between the first position measurement and the second position measurement to a look-up table corresponding to a known temperature. The ATF temperature estimation module 216 estimates ATF temperature within the accumulator to be the expected temperature correlating to the actual period of time between the first position measurement and the second position measurement.

In another example, the ATF temperature estimation module 216 may estimate the accumulator ATF temperature based on a relationship between an accumulator pressure measurement and a corresponding expected temperature. For example, the ATF temperature estimation module 216 may compare the accumulator pressure measurement with a look-up table of accumulator pressures. Each accumulator pressure may correlate to an expected temperature in the look-up table. The ATF estimation module 216 may therefore estimate the accumulator ATF temperature based on the correlation between the measured accumulator pressure and the expected temperature.

In another example, the ATF temperature estimation module 216 estimates the accumulator ATF temperature based on a summation of absolute values of error between a plurality of accumulator pressure measurements and sets of predetermined accumulator pressures over a period. The ATF temperature estimation module 216 may receive a plurality of accumulator pressure measurements from the accumulator control module 212. The ATF temperature estimation module 216 may also receive corresponding periods correlating to a release of an accumulator and each of the accumulator pressure measurements from the accumulator module 212.

The ATF temperature estimation module 216 may determine a first summation of absolute values of error between each of the accumulator pressure measurements and each of a first set of predetermined accumulator pressures over a period (i.e., a first error set). The ATF temperature estimation module 216 may determine a second summation of absolute values of error between each of the accumulator pressure measurements and each of a second set of predetermined accumulator pressures over the period (i.e., a second error set). Each of the first set and the second set of predetermined accumulator pressures correlate to an expected ATF temperature. The ATF temperature estimation module 216 may estimate the accumulator ATF temperature based on the expected ATF temperature corresponding to a lesser of the first summations and the second summation. In other words, the ATF temperature estimation module 216 determines the summation with the smallest value. The ATF estimation module 216 estimates the accumulator ATF temperature based on the expected temperature of the predetermined accumulator pressure set corresponding to the smallest summation.

The ATF temperature estimation module 216 communicates with the ESS control module 220. For example, the ATF temperature estimation module 216 may send the ESS control module 220 the estimated accumulator ATF temperature. The ESS control module 220 determines whether to enable or disable ESS based on the estimated accumulator ATF temperature. For example, the ESS control module 220 enables ESS if the estimated accumulator ATF temperature is within a predetermined temperature range. The ESS control module 220 may disable ESS if the estimated accumulator ATF temperature is outside of the predetermined temperature range. When ESS is disabled, the engine 102 may be left running while the vehicle is not in motion instead of being shut down and later re-started.

The accumulator control module 212 may determine whether to charge the accumulator based on the estimated accumulator ATF temperature. For example, the accumulator control module 212 may charge the accumulator with ATF when the estimated accumulator ATF temperature is outside of the predetermined temperature range.

Figure 3:
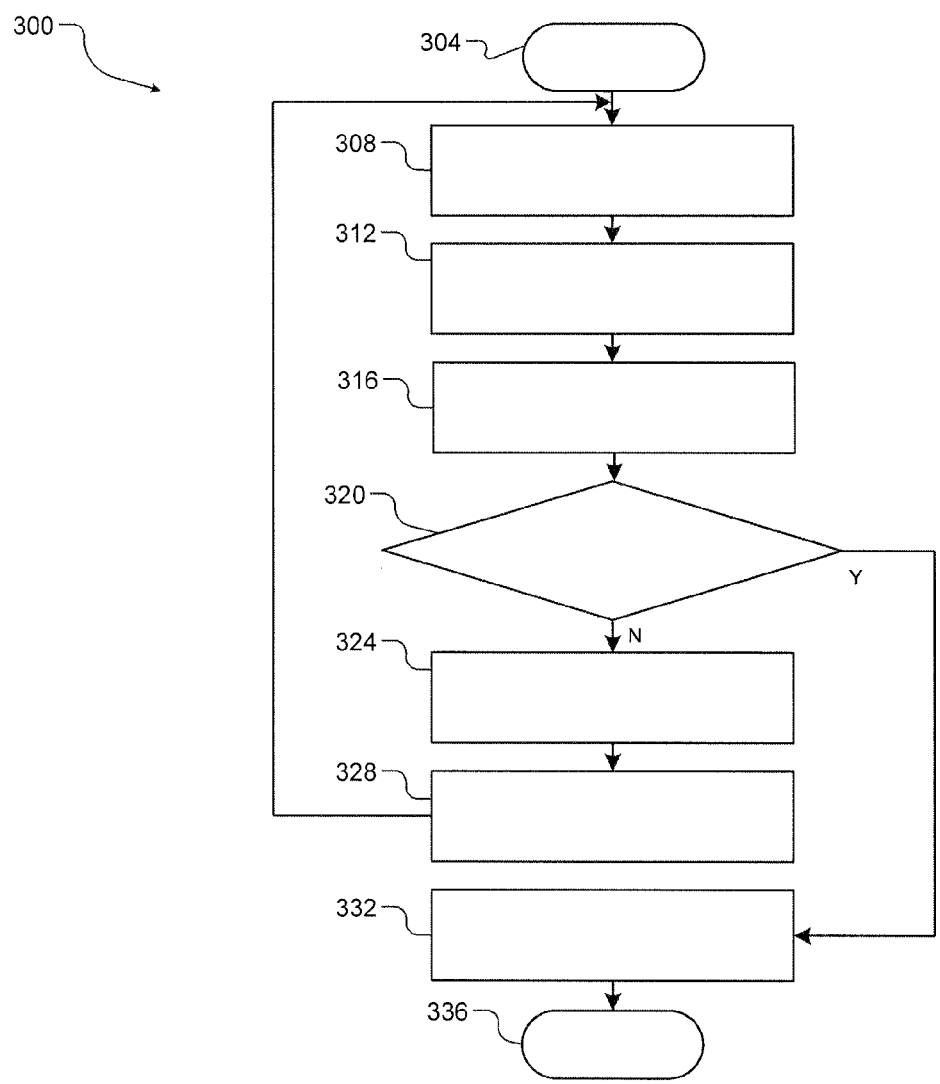
FIG. 3 is a flow diagram illustrating a fluid temperature estimation method according to the present disclosure.

Referring now to FIG. 3, a accumulator fluid temperature estimation method 300 begins at 304. At 308, the method 300 releases ATF from the accumulator. At 312, the method 300 monitors the pressure in the accumulator. At 316, the method 300 estimates the accumulator ATF temperature. At 320, the method 300 determines whether the accumulator ATF temperature is within the predetermined temperature range. If true, the method 300 continues at 332. If false, the method 300 continues at 324. At 324, the method 300 disables ESS. At 328, the method 300 charges the accumulator with ATF. The method 300 continues at 308. At 332, the method 300 enables ESS. The method 300 ends at 336.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
   an accumulator control module that selectively releases automatic transmission fluid from an accumulator and that receives a plurality of measured characteristics of the accumulator;
   a temperature estimation module that estimates a temperature of the automatic transmission fluid within the accumulator based on at least one of the measured characteristics of the accumulator; and
   an engine start-stop module that selectively disables automatic start-stop events of an internal combustion engine based on the estimated temperature of the automatic transmission fluid within the accumulator.

2. The system of claim 1 wherein the temperature estimation module receives a first accumulator pressure measurement, a second accumulator pressure measurement, and a period between the first accumulator pressure measurement and the second accumulator pressure measurement.

3. The system of claim 2 wherein the temperature estimation module estimates the temperature of the automatic transmission fluid within the accumulator as a function of a predetermined period and the period between the first accumulator pressure measurement and the second accumulator pressure measurement.

4. The system of claim 1 wherein the temperature estimation module receives an accumulator pressure measurement from the accumulator control module.

5. The system of claim 4 wherein the temperature estimation module estimates the temperature of the automatic transmission fluid within the accumulator as a function of a predetermined temperature corresponding to a predetermined pressure and a relationship between the accumulator pressure measurement and the predetermined pressure.

6. The system of claim 1 wherein the temperature estimation module receives a plurality of accumulator pressure measurements.

7. The system of claim 6 wherein the temperature estimation module estimates the temperature of the automatic transmission fluid within the accumulator based on summation of absolute values of error between each of the plurality of accumulator pressure measurements and a plurality of predetermined accumulator pressures.

8. The system of claim 1 wherein the engine start-stop module disables automatic start-stop events of the internal combustion engine when the estimated temperature of the automatic transmission fluid within the accumulator is outside a predetermined temperature range.

9. The system of claim 8 wherein the engine start-stop module allows automatic start-stop events of the internal combustion engine when the estimated temperature of the automatic transmission fluid within the accumulator is within the predetermined temperature range.

10. The system of claim 1 wherein plurality of measured characteristics of the accumulator includes a first accumulator piston position measurement, a second accumulator piston position measurement, and a period between the first accumulator piston position measurement and the second accumulator piston position measurement.

11. A method comprising:
    selectively releasing automatic transmission fluid from an accumulator;
    receiving a plurality of measured characteristics of the accumulator;
    estimating a temperature of the automatic transmission fluid within the accumulator based on at least one of the measured characteristics of the accumulator; and
    selectively disabling automatic start-stop events of an internal combustion engine based on the estimated temperature of the automatic transmission fluid within the accumulator.

12. The method of claim 11 further comprising receiving a first accumulator pressure measurement, a second accumulator pressure measurement, and a period between the first accumulator pressure measurement and the second accumulator pressure measurement.

13. The method of claim 12 further comprising estimating the temperature of the automatic transmission fluid within the accumulator as a function of a predetermined period and the period between the first accumulator pressure measurement and the second accumulator pressure measurement.

14. The method of claim 11 further comprising receiving an accumulator pressure measurement.

15. The method of claim 14 further comprising estimating the temperature of the automatic transmission fluid within the accumulator as a function of a predetermined temperature corresponding to a predetermined pressure and a relationship between the accumulator pressure measurement and the predetermined pressure.

16. The method of claim 11 further comprising receiving a plurality of accumulator pressure measurements.

17. The method of claim 16 further comprising estimating the temperature of the automatic transmission fluid within the accumulator based on a summation of absolute values of error between each of the plurality of accumulator pressure measurements and a plurality of predetermined accumulator pressures.

18. The method of claim 11 further comprising disabling automatic start-stop events of the internal combustion engine when the estimated temperature of the automatic transmission fluid within the accumulator is outside a predetermined temperature range.

19. The method of claim 18 further comprising allowing automatic start-stop events of the internal combustion engine when the estimated temperature of the automatic transmission fluid within the accumulator is within the predetermined temperature range.

* * * * *